(12) United States Patent
Esterberg et al.

(10) Patent No.: US 7,052,146 B2
(45) Date of Patent: May 30, 2006

(54) REPLACEABLE COLOR WHEEL

(75) Inventors: Dennis Raymond Esterberg, Philomath, OR (US); Gregory J. May, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 66 days.

(21) Appl. No.: 10/763,266

(22) Filed: Jan. 26, 2004

(65) Prior Publication Data

US 2005/0162622 A1    Jul. 28, 2005

(51) Int. Cl.
*G03B 21/14* (2006.01)
*G02B 5/22* (2006.01)

(52) U.S. Cl. .................. 353/119; 353/84; 359/889; 359/892

(58) Field of Classification Search .................. 353/84, 353/31, 119, 121, 122; 359/885–892; 348/759, 348/766, 770, 771, 816
See application file for complete search history.

(56) References Cited

U.S. PATENT DOCUMENTS

| | | | | |
|---|---|---|---|---|
| 4,758,075 A * | 7/1988 | Hatano | ........................ | 359/723 |
| 6,011,662 A * | 1/2000 | Evans | ........................ | 359/891 |
| 6,155,687 A * | 12/2000 | Peterson | ........................ | 353/84 |
| 6,392,717 B1* | 5/2002 | Kunzman | .................... | 348/744 |
| 6,567,225 B1* | 5/2003 | Derian | ........................ | 359/892 |
| 6,755,554 B1* | 6/2004 | Ohmae et al. | .............. | 362/293 |
| 6,874,892 B1* | 4/2005 | McDaniel | .................... | 353/84 |
| 2003/0095349 A1* | 5/2003 | Inamoto | ..................... | 359/889 |
| 2003/0128000 A1* | 7/2003 | Nakanishi | .................... | 315/408 |
| 2004/0135975 A1* | 7/2004 | Wang | .......................... | 353/84 |

FOREIGN PATENT DOCUMENTS

EP              0749250          * 12/1996

* cited by examiner

*Primary Examiner*—William Perkey
*Assistant Examiner*—Andrew Sever

(57) ABSTRACT

A projector, comprising a user replaceable color wheel.

33 Claims, 4 Drawing Sheets

REPLACEABLE COLOR WHEEL

BACKGROUND

Currently digital projectors are designed with fixed color wheel solutions. Typically, when a customer buys a business digital projector, a unit is obtained where color integrity has been sacrificed for brightness/lumens on the wall. Different color requirement for specialty markets that demand different color spaces, could benefit from projectors with a specially tuned color space. For example, the museum market could benefit from a projector with a color space that is tuned to deliver truer colors that match the "oils" or "watercolor" in the paintings. Likewise, home projector applications and X-ray reading applications will have different requirements. Meeting these different color space requirements forces the manufacturer to have multiple products that are optimized for specific uses. However, a requirement for manufacturing and stocking different projectors for different specialty markets is not cost-effective.

DETAILED DESCRIPTION OF THE EMBODIMENTS

Figure 1:
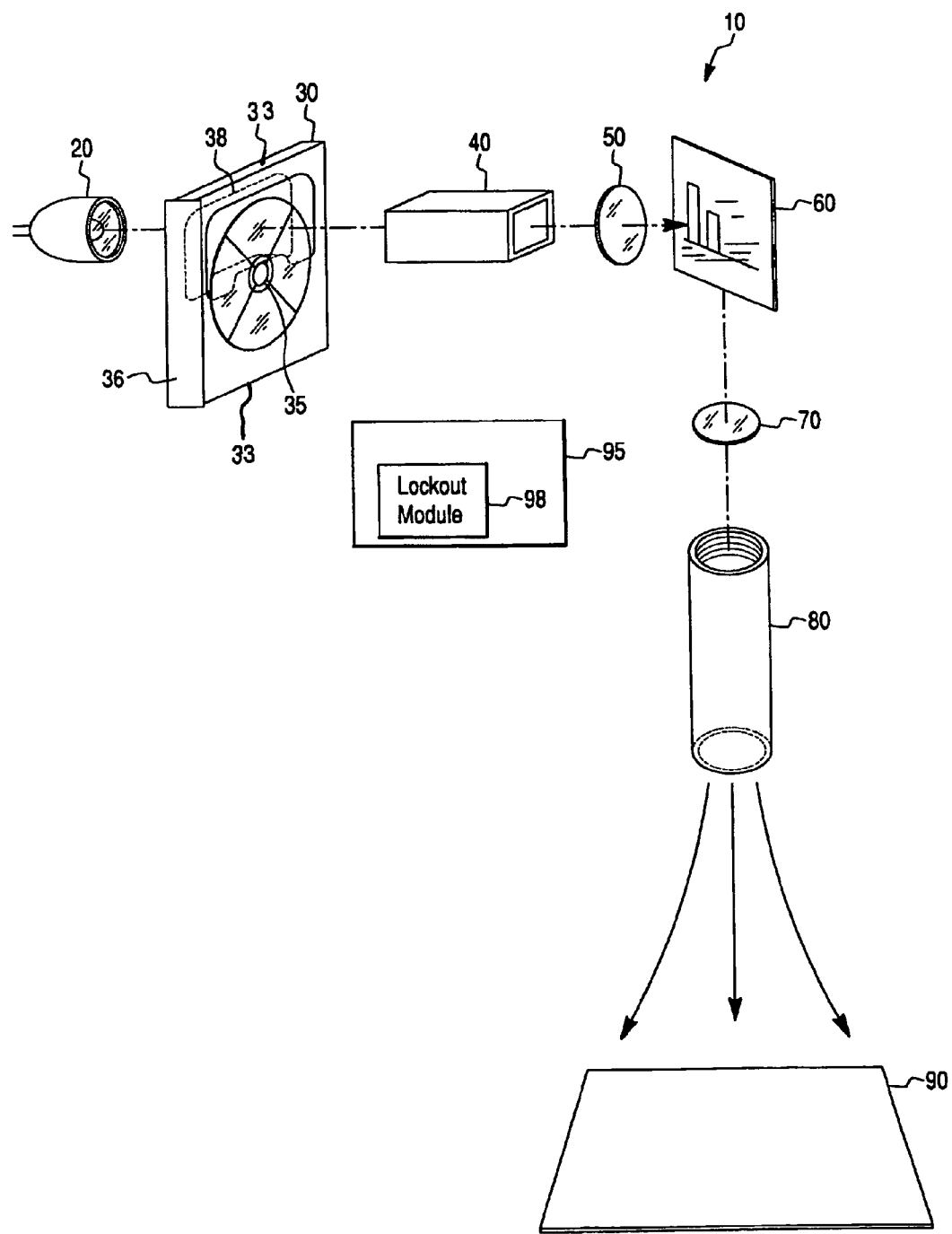
FIG. 1 is a schematic block diagram a projector system for one embodiment of the present invention.

Referring to FIG. 1, one embodiment 10 of the present invention is shown. In the embodiment a projector 10 is provided that includes a light source 20, and a replaceable color wheel 30 seated on a spindle 35 in a housing 36 for projecting light onto a screen 90. A variety of means may be used to bring the light exiting the color wheel to the screen 90. By way of example and not by way of limitation, one such means may comprise an integrating rod 40, a lens 50, a DMD 60 (Digital Mirror Device), and second lens 70, and a projector lens 80.

A cutout portion 38 is provided in the spindle 35 to permit light to be projected therethrough to impinge on only a portion of a color wheel seated thereon. In one embodiment the cutout 38 exposes less than fifty percent of the color wheel to the light. In one embodiment, the spindle 35 and housing 36 may take a configuration like a CD ROM player driver with a drawer installed on a projector in-line with a color wheel placement in the projector. The drawer may have a surface 33 that slides on a track for ease of removal. A motor drive in the housing 36 may be set to match requirements for driving a color wheel. Note that depending on the weight and thickness of the color wheel, the support structure requirements will be similar to CD ROM drives including the mechanism to hold the color wheel in place. A user could, in one embodiment, perform the same operation they would perform if they were changing a CD. For example, in one embodiment a tray could slide out, so that an old color wheel 30 could be accessed and replaced with a new color wheel 30. Thus, a user in one embodiment could perform the same operation they would perform if they were changing a CD, i.e., sliding a tray, pulling off an old color wheel and replacing with a new color wheel. In one embodiment the tray could have a structure and a metal selected for heat tolerance as compared to a CD tray. Note that the present invention is not limited to CDROM type structures, and that any type of optical drive or any size could be used. The size of the drive is not limiting on the invention. The spindle 35 could be driven vertically or horizontally as needed to align appropriately with the light source 20. A processor 95 that includes appropriate firmware is included to control the operation of the projector 10.

Figure 2:
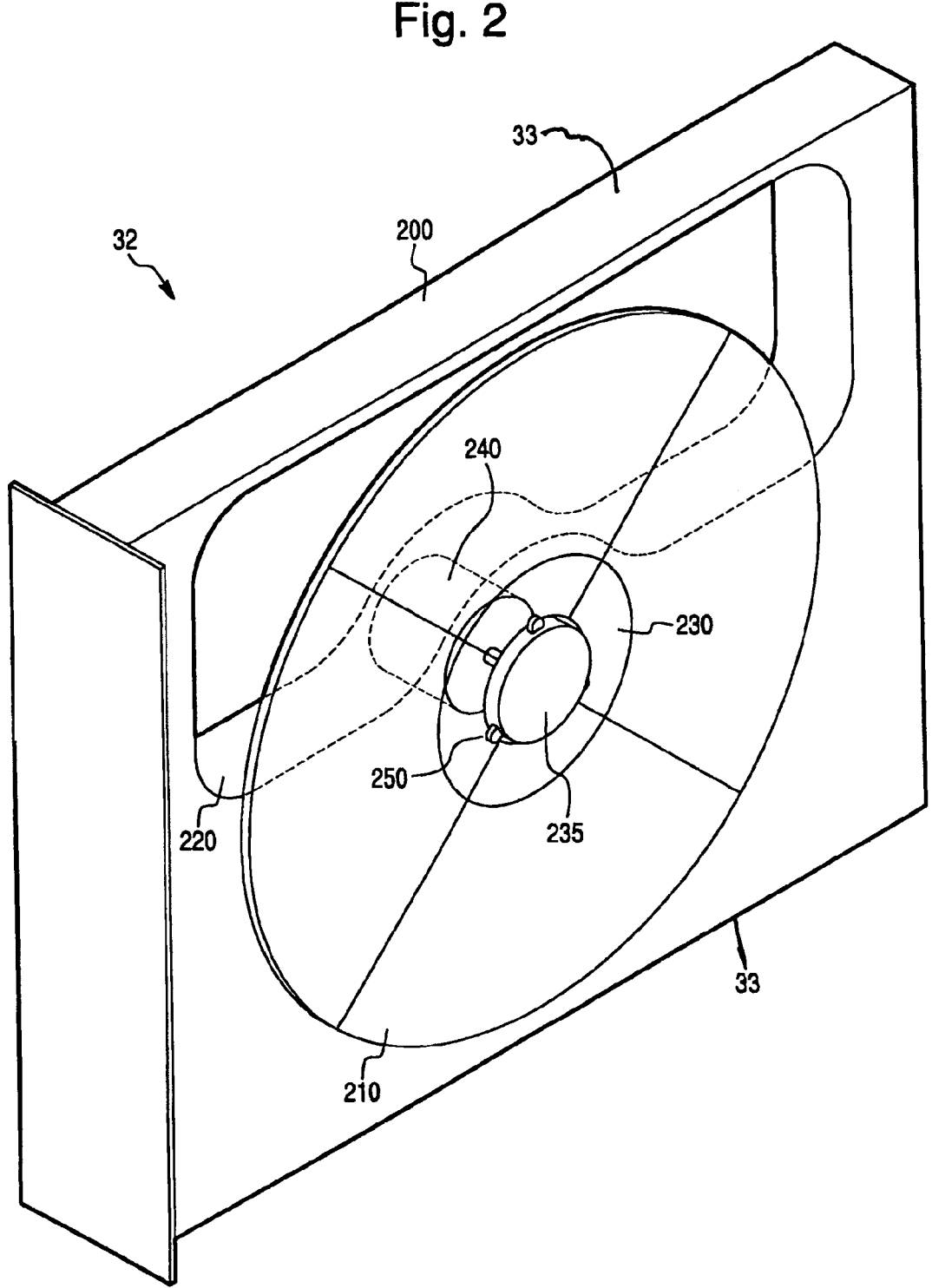
FIG. 2 is an embodiment of a color wheel tray/cartridge for the present invention.

Referring to FIG. 2, one embodiment of a color wheel tray or cartridge 32 is shown. The color wheel tray or cartridge 32 may comprise a color wheel housing 200, which in one embodiment may be a slidable tray. In a different embodiment, it may comprise a removable cartridge 32. The color wheel housing 200 has a spindle 235. In one embodiment, a motor 240 may be included in the cartridge 32 to drive the spindle 235. In another embodiment of the cartridge 32, the motor may be separate from the cartridge 35, and may be engaged by a user placing the spindle 235 into engagement therewith. Alternatively, the cartridge may be slid sideways into position, and the motor raised into engagement therewith. The cartridge 32 further includes a cutout 220 formed in a portion of the color wheel housing 200 to permit light from a light source to impinge through a color wheel on to the rest of the projector system.

A color wheel 210 is shown in the figure seated on the spindle 235. In the embodiment shown, the color wheel comprises a red segment, a green segment, a blue segment, and a white segment although any combination may be applied not limited to three or four color segments. A mechanism 250 may be provided to hold the color wheel 210 in place. By way of example, the mechanism 250 may comprise positional holding pins to hold the color wheel 210 seated on the spindle.

In a further embodiment of the invention, data may be stored on the color wheel in a memory 230, for example by methods such as barcodes or by placing color wheel information on the color wheel encoded as information. This information could include color timing, color segment timing data about the color wheel, color space data for each color segment, the number of color segments and all the relevant information for the projector to actually download information needed to truly make full use of the color wheel just installed. This data need not be oriented to physically coincide with the physical layout of the color segments. The barcoded data, however, could be used for physical timing. The data could be stored in the memory 230 at some convenient location such as near the outside perimeter of the color wheel or on an inside track of the color wheel 210, leaving the outer portion of the color wheel 210 for use as the color wheel operations. In a further embodiment of the invention, barcodes on the color wheel 210 could be used to point to a correct color science table to allow the projector to read and install a latest color map. As noted previously, the cutout 220 may be sized to so that less than 50% of the color wheel is exposed to the light. The portion not exposed to the light protects the data from high heat and high UV content emanating from the light source 20.

Figure 3:
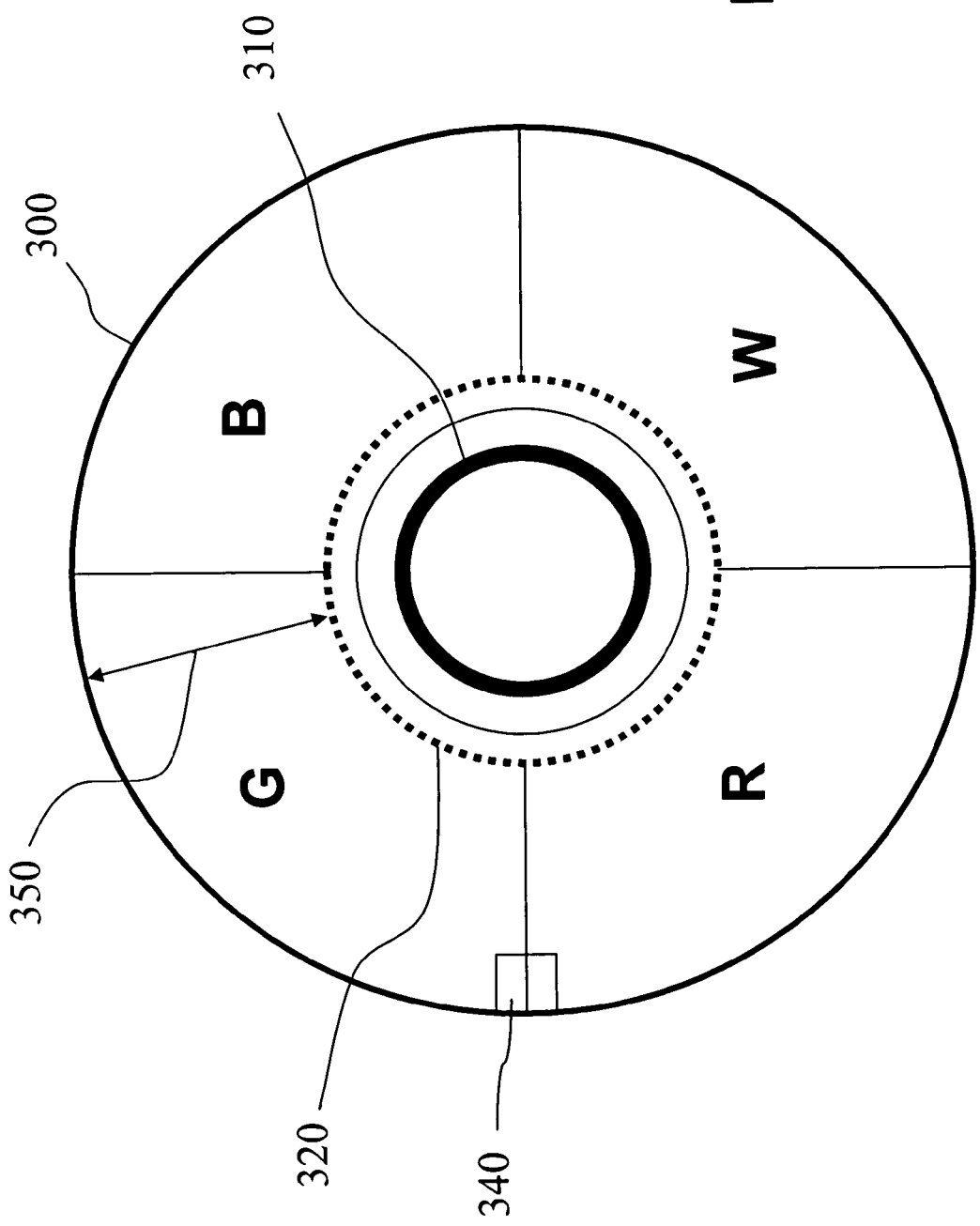
FIG. 3 is an embodiment of a color wheel for the invention.

Referring to FIG. 3, an embodiment of a color wheel 300 is illustrated. The color wheel 300 has multiple color sections ( note that the number of color sections on a color wheel is variable and not limiting on the invention), a color wheel mounting hole 310, a memory 320 that may include color wheel characteristics thereon for the processor 95 (see FIG. 1), and a timing mask mark 340, and a color segment space 350. Accordingly, in one embodiment a projector system could identify which particular color wheel had been seated on its spindle 35 by a coding disposed at some location on the color wheel, such as near a perimeter thereof or in the memory 320 thereon, and read such ID data as the color wheel spins. As noted above, such data could be in any convenient form, such as binary data or barcodes, and a simple system could be implemented to read those codes. It is, of course, understood, that a particular color selection and identification could always be forced manually by a user selecting data from a menu.

Figure 4:
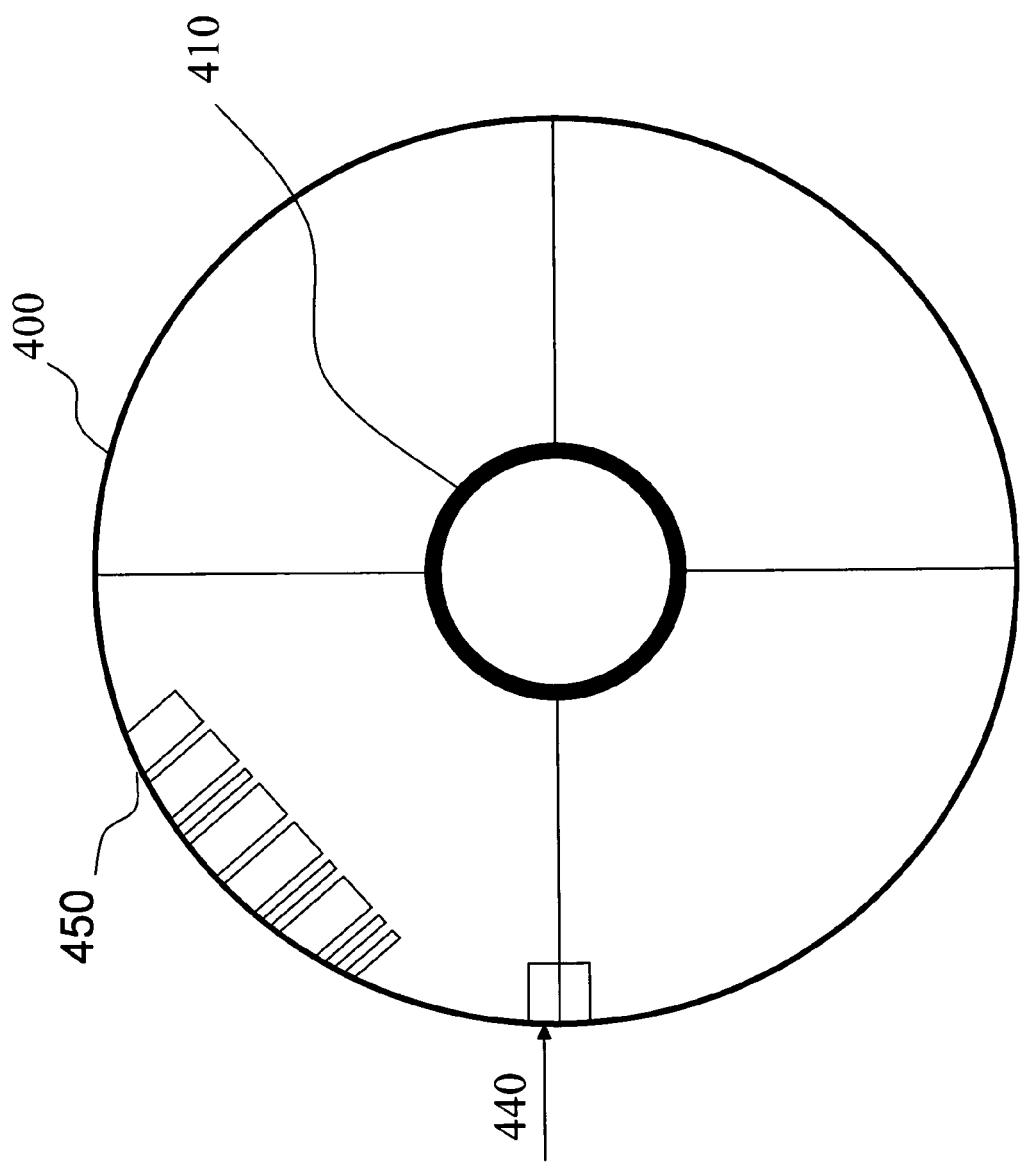
FIG. 4 is an different embodiment of a color wheel for the present invention.

Referring to FIG. 4, a further embodiment of a color wheel 400 is illustrated. The color wheel 400 again has color quadrants, a color wheel mounting hole 410, a timing mask mark 440, and a portion 450 with other color wheel identification and timing information. Note that this embodiment provides the data near the outside perimeter of the color wheel 400, but as noted previously, the data could alternatively or in addition by stored in a memory on the inside perimeter as well.

In one embodiment, tracking of the timing for the color wheel could be accomplished with an optical emitter and pickup sensor so the color wheel spins to the proper speed and timing to synchronize colors on the wheel to the image being projected. Alternatively, light from the light source 20 could be used as an illuminator and an optical pickup could be placed on the opposite side of the color wheel from the light source 20 to sense light coming therefrom through the color wheel.

In one embodiment, an optical device reading system could be included to provide color management support and for other purposes. Such an optical device reading system could take a variety of configuration, and might include, for example, a read head (not shown) connected to the projector processor 95.

In a further embodiment, a mechanism 98 (FIG. 1) could be provided, for example in the firmware in the processor 95, to lock out/deactivate the light source 20 if an indication signal was received that the optical device reader was to be used to update firmware in the projector system or for other purposes. For example, if this drive mechanism was selected, then the firmware in the projector system could be updated by just inserting a disc onto the spindle. The system would then lock out and not light the light source. Note that the selection of the optical device reader could be accomplished by a recognition system that looks for indications on the seated disc to indicate whether it is a color wheel or other optical media. If it is determined that the disc is not a color wheel based on markings or other data recorded on the seated disc, then the light source would be locked out and not turned on. In one embodiment, this mechanism could function as a hidden lock on the projector that would prevent, for example, the use of non-conforming or incompatible color wheels.

Note that the recognition of the seating of a proper (as determined by markings or data recorded thereon) color wheel, could be used to launch special applications such as test procedures. These test procedures could even be included in the CD track 230 on the color wheel 210.

Accordingly, with the projector in the powered down state, a customer may remove the color wheel cartridge from the projector and install a new color wheel cartridge. When the projector is powered up, the color wheel sequence information from the cartridge is loaded into the projector. The projector is now optimized to meet the customers requirement.

By providing accessory color wheel cartridges in accordance with embodiments of the present invention, a customer can optimize its projector for different specialty uses. For example, a home theater cartridge could be provided for home use, a business graphic cartridge for work applications, a black and white cartridge could be provided for old movie buffs, an X-ray cartridge could be provided for X-ray viewing, and a museum cartridge could be provided for museum type applications, to name just a few such possibilities.

Note that selected embodiments of the invention have one or more of the following advantages: it allows customer to change color space by easily changing color wheels or color wheel cartridges, it allows a manufacturer to approach specialty markets with custom wheels (for example specialty colors spaces for art, or museums, or science), it is easy to install color wheels in manufacturing per customer order (preloading), it would be easier to change color wheels—customers would be more familiar with this style, and allows a manufacturer to differentiate itself from its competition, the design allows changing color wheel information without hardcoding this information in the projector before the end of a manufacturing line, custom color wheel information stays with the color wheel, and the same mechanism used to read the data on the color wheel which could be used to update firmware in the projector.

Based on the foregoing, a number of methods are facilitated for projectors. In one embodiment of the invention, a method is facilitated for operating a projector, comprises loading a replaceable color wheel into a projector; and downloading from the replaceable color wheel data to the projector a firmware upgrade for the projector. In another embodiment of the invention, a method for operating a projector can include downloading a diagnostic program from the replaceable color wheel memory, and then running the diagnostics program on the projector. In a yet further embodiment of the invention, a method for operating a projector may include detecting timing marks on the replaceable color wheel to force timing related to color segments on the replaceable color wheel to hereby allow different color wheels to be used on the projector. Thus in this embodiment, the projector relies on the timing marks on the color wheel to know what color is occurring when.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A projector comprising: a color wheel cartridge; wherein the color wheel cartridge comprises:
   a readily removable color wheel housing for receiving a color wheel disc, wherein the color wheel housing is configured to be readily removed from and inserted into an operative position in the projector, the color wheel housing having, a cutout portion to permit light to be projected therethrough to impinge on only a portion of the color wheel disc disposed therein, and a surface that slides on a track of the projector, for ease of removal.

2. The projector as defined in claim 1, further comprising a motor assembly to drive the color wheel disc.

3. The projector as defined in claim 1, wherein the cutout exposes less than fifty percent of the color wheel disc to the light.

4. The projector as defined in claim 1, wherein the color wheel disc has a memory disposed on a portion of thereof.

5. The projector as defined in claim 4, wherein the memory contains color wheel characteristics data.

6. The, projector as defined in claim 4, wherein the memory contains firmware.

7. The projector as defined in claim 4, wherein the memory contains a diagnostic program.

8. The projector as defined in claim 4, wherein the memory contains color space data.

9. The projector as defined in claim 4, wherein the color wheel is replacable with optical media that is accessable by the projector.

10. The projector as defined in claim 9, wherein the memory is disposed at or adjacent a center of the color wheel disc.

11. The projector as defined in claim 9, wherein the memory includes key data to authorize an operation of a projector.

12. The color wheel as defined in claim 1, further comprising a data portion disposed adjacent a perimeter of the color wheel disc.

13. The projector as defined in claim 1, wherein the color wheel housing is configured to allow the color wheel disc to be readily replaceable in the readily removable from color wheel housing.

14. A color wheel for use in a projector, comprising:
a replaceable color wheel disc configured to be easily slideable by a user into the projector; and
a memory for color wheel characteristics data disposed on the color wheel disc optically readable by the projector to allow downloading of information into the projector.

15. The color wheel as defined in claim 14, wherein the color wheel disc has a mounting hole therein.

16. The color wheel as defined in claim 15, wherein the memory is disposed adjacent the mounting hole.

17. The color wheel as defined in claim 14, further comprising:
a first timing mark; and
a data region on the outer periphery of the color wheel disc forming at least a portion of the memory.

18. The color wheel as defined in claim 14, wherein the memory includes firmware.

19. The color wheel as defined in claim 14, wherein the memory includes a diagnostic program.

20. The color wheel as defined in claim 14, wherein the memory includes color space data.

21. A projector, comprising:
means for easily and slideably replacing a color wheel by a user of the projector; and
means for directing light from a light source through at least a portion of the color wheel.

22. The projector as defined in claim 21, further comprising means for preventing the projector from being illuminated unless data is detected on the color wheel indicating that the color wheel is authorized.

23. The projector as defined in claim 21, further comprising a data reader disposed to read data present on the color wheel.

24. A projector, comprising:
means for readily replacing a color wheel: and
means for directing light from a light source through at least a portion of the color wheel and wherein the means for directing light prevents lights from being directed through the color wheel when the data reader is activated.

25. A projector, comprising:
a replaceable projector easily slideable into the projector by a user including a housing with a spindle for receiving a color wheel disc the housing having a cutout portion to permit light to be projected therethrough to impinge on only a portion of the color wheel disc disposed therein, the color wheel disc disposed on the spindle, and a motor for driving the spindle; and
means for directing light from a light source through at least a portion of the color wheel disc.

26. The projector as defined in claim 25, further comprising means for preventing the projector from being illuminated unless data is detected on the color wheel disc indicating that the color wheel disc is authorized.

27. The projector as defined in claim 25, further comprising a data reader disposed to read data present on the color wheel disc.

28. The projector as defined in claim 25, wherein the color wheel disc has a memory disposed in a portion of thereof.

29. The projector as defined in claim 28, wherein the memory contains color wheel characteristics data.

30. A projector, comprising:
a replaceable projector including a housing with a spindle for receiving a color wheel disc, the housing having a cutout portion to permit light to be projected therethrouh to impinge on only a portion of the color wheel disc therein, the color wheel disc disposed on the spindle, and a motor for driving the spindle;
means for directing light from a light source through at least a portion of the color wheel disc: and
a data reader disposed to read data present on the color wheel disc, wherein the means for directing light prevents lights from being directed through the color wheel disc when the data reader is activated.

31. A method for operating a projector, comprising:
loading a replaceable color wheel easily and slideably into a projector; and
downloading from the replaceable color wheel data to the projector a firmware upgrade for the projector.

32. A method for operating a projector, comprising:
loading a replaceable color wheel easily and slideably into a projector; and
downloading from the replaceable color wheel data comprising a diagnostics program; and
running the diagnostics program on the projector.

33. A method for operating a projector, comprising:
loading a replaceable color wheel easily and slideably into the projector; and
detecting timing marks on the replaceable color wheel to forcing timing related to color segments on the replaceable color wheel to thereby allow different color wheels to be used on the projector.

* * * * *

UNITED STATES PATENT AND TRADEMARK OFFICE
CERTIFICATE OF CORRECTION

| | | |
|---|---|---|
| PATENT NO. | : 7,052,146 B2 | Page 1 of 1 |
| APPLICATION NO. | : 10/763266 | |
| DATED | : May 30, 2006 | |
| INVENTOR(S) | : Esterberg et al. | |

It is certified that error appears in the above-identified patent and that said Letters Patent is hereby corrected as shown below:

In the Claims

Col. 5 (line 35), after "the", delete "readily removable from--".

Col. 5 (line 40), after "memory", delete "for color wheel characteristics data".

Col. 6 (line 5), delete "wheel:" and insert therefor --wheel;--.

Col. 6 (line 14), delete "disc" and inset therefor --disc,--.

Col. 6 (line 34), delete "projector" and insert therefor --color wheel cartridge--.

Col. 6 (line 41), delete "disc:" and insert therefor --disc;--.

Signed and Sealed this

Twenty-third Day of January, 2007

JON W. DUDAS
*Director of the United States Patent and Trademark Office*